(12) United States Patent
Prabhu

(10) Patent No.: US 10,697,630 B1
(45) Date of Patent: Jun. 30, 2020

(54) APPARATUS AND METHOD FOR REACTING FLUIDS USING A POROUS HEAT EXCHANGER

(71) Applicant: Edan Prabhu, Mission Viejo, CA (US)

(72) Inventor: Edan Prabhu, Mission Viejo, CA (US)

( * ) Notice: Subject to any disclaimer, the term of this patent is extended or adjusted under 35 U.S.C. 154(b) by 0 days.

(21) Appl. No.: 16/530,852

(22) Filed: Aug. 2, 2019

(51) Int. Cl.
*F23C 13/00* (2006.01)
*F23C 99/00* (2006.01)
*F23C 13/02* (2006.01)

(52) U.S. Cl.
CPC ............ *F23C 99/006* (2013.01); *F23C 13/02* (2013.01); *F23C 2202/10* (2013.01)

(58) Field of Classification Search
CPC .................................................. F23C 99/006
USPC .............................................. 431/7; 165/148
See application file for complete search history.

(56) References Cited

U.S. PATENT DOCUMENTS

| | | |
|---|---|---|
| 3,810,732 A | 5/1974 | Koch |
| 3,928,961 A | 12/1975 | Pfefferle |
| 3,975,900 A | 8/1976 | Pfefferle |
| 4,052,143 A | 10/1977 | Sandviknes |
| 4,202,168 A | 5/1980 | Acheson et al. |
| 4,202,169 A | 5/1980 | Acheson et al. |
| 4,209,303 A | 6/1980 | Ricks |
| 4,403,941 A | 9/1983 | Okiura et al. |
| 4,442,901 A | 4/1984 | Zison |
| 4,467,610 A | 8/1984 | Pearson et al. |
| 4,534,165 A | 8/1985 | Davis, Jr. et al. |
| 4,643,890 A | 2/1987 | Schramm |
| 4,769,149 A | 9/1988 | Nobilet et al. |
| 4,870,824 A | 10/1989 | Young et al. |
| 5,108,717 A | 4/1992 | Deller et al. |
| 5,165,884 A | 11/1992 | Martin et al. |
| 5,263,314 A | 11/1993 | Anderson |
| 5,326,253 A | 7/1994 | Dalla Betta et al. |
| 5,326,537 A | 7/1994 | Cleary |
| 5,329,955 A | 7/1994 | Gensler et al. |
| 5,533,890 A | 7/1996 | Hoist et al. |

(Continued)

FOREIGN PATENT DOCUMENTS

| | | |
|---|---|---|
| CA | 2251627 | 7/2002 |
| JP | 2004105306 | 4/2004 |

OTHER PUBLICATIONS

U.S. Appl. No. 12/772,622, Prabhu.

*Primary Examiner* — Avinash A Savani
(74) *Attorney, Agent, or Firm* — Cionca IP Law P.C.; Marin Cionca

(57) ABSTRACT

A reactor for a mixture of fluids that can react with each other exothermically, the reactor combining the properties of heat transfer and porosity, and having a first chamber wherein reacted fluids are maintained above the reaction temperature threshold, a second chamber disposed adjacent to the first chamber, wherein unreacted fluids enter the second chamber at a temperature that is below a reaction temperature threshold that is necessary for reaction of the fluids to occur, the fluids flowing in a second direction, opposite the first direction and a porous wall disposed between the first chamber and a second chamber, allowing portions of the unreacted fluids from the second chamber to seep into the reacted fluids of the first chamber, thereby heating the seeped fluids, causing the seeped fluids to react, the reaction increasing the temperature of the reacted fluid.

18 Claims, 8 Drawing Sheets

(56) References Cited

U.S. PATENT DOCUMENTS

| | | | |
|---|---|---|---|
| 5,583,240 A * | 12/1996 | Asher | B01D 63/061 554/98 |
| 5,592,811 A | 1/1997 | Dodge et al. | |
| 5,635,139 A | 6/1997 | Hoist et al. | |
| 5,649,720 A | 7/1997 | Rink | |
| 5,685,156 A | 11/1997 | Willis et al. | |
| 5,832,713 A | 11/1998 | Maese et al. | |
| 5,862,858 A | 1/1999 | Wellington et al. | |
| 5,921,763 A | 7/1999 | Martin | |
| 6,019,172 A | 2/2000 | Wellington et al. | |
| 6,033,207 A | 3/2000 | Cummings | |
| 6,107,693 A | 8/2000 | Mongia et al. | |
| 6,142,222 A * | 11/2000 | Kang | F28D 1/05375 165/148 |
| 6,158,222 A | 12/2000 | Retallick | |
| 6,205,768 B1 | 3/2001 | Dibble et al. | |
| 6,226,976 B1 | 5/2001 | Scott et al. | |
| 6,334,769 B1 | 1/2002 | Retallick et al. | |
| 6,339,925 B1 | 1/2002 | Hung et al. | |
| 6,482,375 B1 * | 11/2002 | van der Wal | B01J 8/0285 423/210 |
| 6,595,001 B2 | 7/2003 | Rautenbach et al. | |
| 6,675,583 B2 | 1/2004 | Willis et al. | |
| 6,895,760 B2 | 5/2005 | Kesseli | |
| 7,096,671 B2 | 8/2006 | Bland et al. | |
| 8,621,869 B2 | 1/2014 | Prabhu | |
| 8,671,658 B2 | 3/2014 | Prabhu | |
| 8,701,413 B2 | 4/2014 | Prabhu | |
| 8,893,468 B2 | 11/2014 | Prabhu | |
| 9,057,028 B2 | 6/2015 | Prabhu | |
| 9,194,584 B2 | 11/2015 | Watts | |
| 2004/0021235 A1 | 2/2004 | Cor et al. | |
| 2004/0119291 A1 | 6/2004 | Hamrin et al. | |
| 2006/0150635 A1 | 7/2006 | Su et al. | |
| 2007/0054226 A1 | 3/2007 | Carroni et al. | |
| 2009/0100820 A1 | 4/2009 | Prabhu | |
| 2010/0275611 A1 | 11/2010 | Prabhu | |
| 2014/0011523 A1 | 1/2014 | Hines et al. | |

* cited by examiner

APPARATUS AND METHOD FOR REACTING FLUIDS USING A POROUS HEAT EXCHANGER

BACKGROUND OF INVENTION

1. Field of the Invention

The invention relates generally to reactors and more specifically to an reactor that combines heat transfer and porosity to start, control and sustain an exothermic reaction.

2. Description of the Related Art

Chemical reactions are often exothermic and typically require certain temperatures and pressures for the reaction to occur. If a source of heat is provided at the point of mixing, the fluids may start to react, and the reaction sometimes generates enough heat to sustain the reaction. In some cases, the fluids may already be mixed, or it may be desirable to mix the fluids, but the mixture will not react as long as it is below the reaction temperature and pressure threshold necessary for the reaction to occur. Typically, the reaction rate is slower at lower temperatures, and speeds up as the temperatures rise. If the reaction is exothermic, some of the heat released by the reaction may heat up the unreacted fluid, thereby accelerating the rate of reaction. If the fluids are flowing in a limited area such as a pipeline, the rate of flow may exceed the acceleration in the rate of reaction, pushing the point of reaction downstream, which may not be desirable. Special measures may be needed to control the rate of reaction, and to ensure complete reaction. In some cases, the reaction is intended to generate useful heat. The heat may be needed within a temperature range, high enough to be useful but below the limits of the materials that are used and below the limits that may cause harmful by-products.

While other systems and methods for reacting fluids are known, including some designed by the inventor of the instant application, they have limitations and disadvantages. This invention resolves some of those limitations.

In an example, a gas turbine system was designed to receive a mixture of fuel and air, wherein the fuel is heated by an external source to raise the temperature of the mixture above the auto-ignition temperature of the fuel and the mixture is oxidized, the system having a plurality of ports, each port being connected to a supplemental fuel source. The plurality of the ports approach makes the system large and complex, which in turn makes the construction of the system difficult and costly.

In another example, an oxidation chamber was designed to receive a mixture of air and fuel through two inlets, wherein the temperature of the first region in the oxidation chamber is raised to a minimum of the oxidation temperature of the mixture by using the heat of a reaction in a second region of the oxidation chamber, the system having distinct regions for oxidation of fuel, each of the two regions facilitating a separate reaction. The system requires a heat soak media, such as ceramics, to anchor the reaction; ceramics tend to crumble in hot, high velocity environments, and the particles released cause damage when impinging on high speed turbine blades. This system is also large and costly and a lot of heat is lost from its large components. It takes a long time and a lot of fuel to heat up. Furthermore, the large amount of energy stored in the heat soak media acts as a thermal mass, requiring costly heat dissipating devices during unanticipated shutdowns.

Therefore, there is a need to solve the problems described above by providing a better, more compact system and method for achieving efficient exothermic reactions with effective control.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an reactor with a porous interior chamber for heat transfer is provided to bring a mixture of fluids to complete reaction. It achieves the desired temperature with a much more compact reactor, in a less costly way, and with less problems and better control, than other reactors. The disclosed reactor does not have ceramics, and therefore avoids debris from ceramic heat soak media that is used to anchor the reaction in other reactors. As another advantage, when the reactor is used to power a gas turbine, keeping the temperatures just high enough for the gas turbine but below the threshold for forming nitrogen oxides reduces harmful emissions. An additional advantage is that because the reactor is compact, it is more efficient, losing less heat than other systems and does not need to dissipate the heat during unanticipated shutdowns.

In another aspect, the porous heat exchanger breaks the fluid mixture into small particles, making each particle easier to be heated and therefore to react. Heating is achieved by a careful combination of conduction and convection.

In another aspect, an exothermic reactor that combines heat transfer and porosity is provided to raise the temperature of incoming fluid to reaction temperature, wherein the reactor judiciously uses the heat from the exothermic reaction to sustain the reaction, making the need for an external heat source minimal. Another advantage is that the disclosed configuration of the reactor eliminates the use of an intermediate heat soak media.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
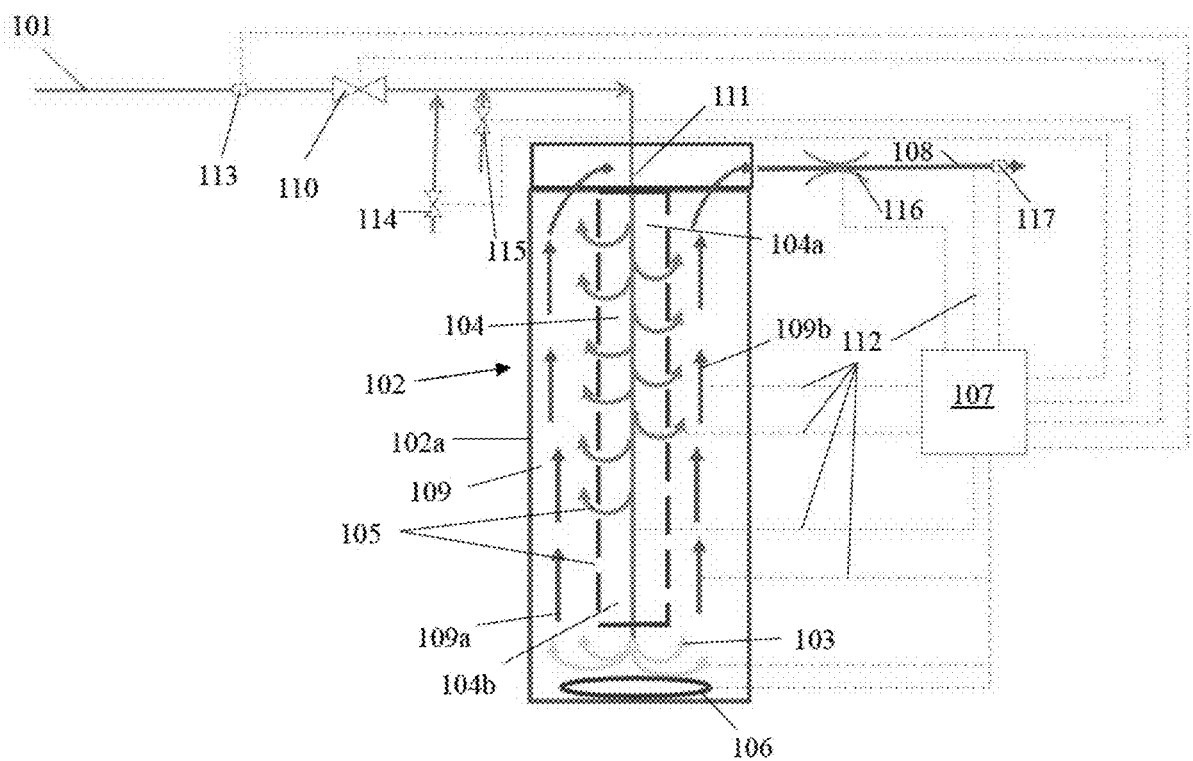
FIG. 1 is a diagram of a reactor having a porous heat exchanger, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 107 and 307, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

The purpose of the invention is to create a compact, cost-effective means for a mixture of two or more fluids to react exothermically while not exceeding a threshold temperature. The heat released by the reaction may be used to generate electricity and for other purposes. The invention also enables the use of weak fluid mixtures that cannot be reacted by other means such as combustion. By limiting the maximum temperature attained, less costly materials may be used, and the formation of harmful by-products may be reduced. There are other benefits as described hereinafter.

FIG. 1 shows a single cell of the device, in which the incoming fluid is being heated to react. A mixture to be reacted may be introduced through means 101 (e.g., a pipe), through a control means such as a flow control valve 110, into a reactor 102. The reactor 102 may be in the form of a cylinder with walls 102a that constitute a boundary within which the fluid mixture may be contained, as disclosed herein. In an example, the cylindrical reactor 102 may contain a tube, or smaller cylinder referred to as the second chamber 104, with pores or perforations 105 along its surface. The wall of the second chamber 104 may be designed to allow the transfer of heat, but it does not allow the transfer of fluid across it, except as intended through the pores 105. The porous wall of the second chamber 104 has a plurality of pores, or perforations 105.

The number, pattern, distribution and/or size of pores 105 of the porous wall of the second chamber may be chosen to allow the desired quantity of fluid to seep through each pore. It is intended that the seepage through each pore be small compared to the total flow, and the flow through any single pore shall be no more than 5% of the total flow through the reactor. By limiting the flow through a single pore, the particles of fluid traveling through that pore are small, and thereby may be more easily mixed with other fluids than if the particles are large.

In operation, the fluid inside the second chamber 104 is generally unreacted, and the fluid in space 109 (also referred to as the "first chamber"), which is the space between the second chamber 104 and the wall 102a of the reactor 102, has generally completed the desired reaction and is hotter than the fluid inside 104.

In operation, shown in FIG. 1, the unreacted fluid mixture entering the reactor at the inlet 111 goes directly into the second chamber 104, and flows downwards through 104, in the direction from 104a to 104b. As it flows downwards, portions of the mixture seep through pores 105 into space (first chamber) 109, and a gradually decreasing portion of the unreacted fluid continues downwards. As it travels downwards, the fluid is heated by heat transferred to it through the wall from the hotter, reacted fluids in space 109. This heating may be sufficient for some of the fluid to begin reacting.

In an example, if the heated fluid 103 exiting the bottom of the second chamber 104 has not yet fully reacted, it may be further heated by an external heater 106 (such as an electrical heater or gas burner) 106 to the point where the reaction is completed. The fluid flow rate at 103 is preferably a small fraction of the fluid flow rate entering at 111, because by now most of the fluid has seeped through the pores 105. All the fluid at space 103 is reacted; it is also therefore above the reaction temperature. This fluid now reverses direction and flows upwards (see flow 109a) through space (first chamber) 109. As it does so, it meets small particles of fluid seeping through the pores 105, and its flow gradually increases.

The small particles and quantity of fluid seeping from each pore are rapidly heated by mixing with the larger quantity of hotter reacted fluid, causing the fluid to react and release its exothermic energy. The seeping fluid was first heated by conduction through the walls of the second chamber 104, and after it seeps, it is heated by convection as it mixes with the hotter reacted fluid, causing it to react.

It should be noted that several actions are typically taking place simultaneously. The reacted fluid tends to cool as it gives up its heat through conduction and convection. The unreacted fluid is heated through conduction and convection causing it to react. The heat released by reaction raises the temperature of the reacted fluid. As the fluid stream moves up space 109, more and more hot reacted fluid meets small particles and quantities of cooler unreacted fluid, heating it through conduction and convection and causing it to react.

The relative fractions of the mix of unreacted fluids can be controlled such that the temperature of the reacted fluid flowing through space 109 can be substantially constant or even increase as it moves upwards.

In an example, it may be possible to design a system similar to FIG. 1, except that it would have no pores for seepage. In such a system, the principal heat transfer mechanism would be conduction. All fluid would first flow down chamber 104, reach the threshold needed for reaction, and then as it flows up space 109 impart its heat to the incoming unreacted fluid. Such a configuration would be similar to the well-known counter-flow heat exchanger. Such a system would require a much larger heat transfer surface. Such a system would also require a much larger external heater, because the external heater would have to heat all the fluid rather than a small fraction of it.

Furthermore, in such a system, the reacted fluid would give up some of its heat through the walls of 104, and would exit the reactor cooler than it was at 103; if the reaction is designed to increase the reaction temperature to compensate for the loss of heat, the higher temperature could cause harmful by-products and require superior materials.

The porous heat exchanger of this invention avoids all these disadvantages; it is compact; it delivers the reacted fluid at the maximum desired temperature, no more, no less. In addition, the hot side of the heat exchanger stays at substantially the same temperature or even increases, improving the heat transfer to the cooler, unreacted fluid. Being compact, the reactor loses less heat to surrounding areas than other systems.

It is important to this invention that most (e.g., at least 75%) of fluids seep from second chamber 104 to first chamber 109, via pores 105, and thus, that the flow through the bottom of the second chamber 104 is a small fraction of the total flow (e.g., no more than 25%). There are several advantages to keeping it low. For example, the low flow rate allows more time for the fluid to react; it also allows a smaller heater 106 to be used.

It is also important to this invention that the fluid flowing through every pore be in small particle sizes and a small fraction of the total fluid flow because it is necessary for small quantities with small particle sizes of the seeping fluid to mix with much larger quantities of reacted fluid, so that the seeping fluid rapidly heats up and reacts. The pores are designed to allow a very small quantity of fluid to seep through them. As is explained later, the fluid flowing through the pores is intended to mix with hotter fluid flowing up space 109, in the direction from 109a to 109b, and to be rapidly heated through convection which will cause the seeped fluid to react. Each fluid mixture reacts at its own temperature. The size, placement and quantity of pores will depend on the fluids being used. Each fluid mixture also has its own viscosity. The pores should therefore be as small as possible, consistent with manufacturing, volume and flow requirements; when the seeping fluids come into contact with the relatively far larger flow of reacted fluid moving up space 109, the seeped fluids will quickly heat up and react, releasing the heat of reaction, raising the temperature and linking up with the reacted fluid moving up space 109. In an example, each pore may contain only one thousandth of the total fluid flow, and the pores may be placed substantially throughout the wall of 104. It should be noted that the pressure of the fluids drops as it flows down 104 and then back up the space 109. The pressure differential between locations 104a and 109b is greater than the pressure differential between locations 104b and 109a. This difference must be taken into consideration when determining the size and placement of pores. The size of the reactor and each chamber is also based upon fluid flow rates, the time needed for the reaction at the various temperatures, the number and size of pores, and the heat transfer requirements for the system.

The reaction process disclosed herein may be automated and controlled using a controller 107 that receives input from several locations and sends out control commands, as shown by each dotted line (in FIG. 1 for example). These dotted lines are representing the data input and output from and the sensors/probes, valves, and other components of the system shown in FIG. 1.

In FIG. 1, for example, temperature sensors, or temperature probes 112, may be located at two sets of points as shown to measure the temperature of the incoming fluids, the fluid flowing down the second chamber 104, the reacted fluid flowing up in the space 109, the fluid exiting the reactor 102, and at other points. Two sets of points on each the space 109 and the second chamber 104 where the fluid flows have probes 112 because it allows for the temperature change and average speed of the flow to be calculated and recorded by controller 107. A sensor, or mixture probe, 113 may be used to measure the relative concentrations of the constituents of the fluid mixture. A sensor, or a flow measuring probe, 116 may be used to measure the flow rate of the fluid. Valves 114 and 115, one for each fluid in the mixture, are used to add one or more fluids to the mixture as may be needed to control the ratio of each fluid in the fluid mixture.

The valves 110, 114, and 115 may be electrical, pneumatical, or other types of control valves, and sensors 112, 113, 116, and 117 are all typically in constant communication with the controller 107, which is programmed to maintain the appropriate concentrations and temperatures of the fluids in the mixture.

In an example, the control system, formed by the controller 107, a mixture concentration sensing probe 113, temperature probes 112, a fluid flow control valve 114 and 115 for each fluid in the mixture of fluids, and a flow control valve 110, is programmed to receive data from the mixture 113 and temperature probes 112 and based thereon control the fluid and flow control valve 110 as needed to maintain the concentrations of the fluids in the mixture and the temperature of the fluid mixture at desired/optimal levels. In an example, if the reaction temperature desired at the far end 104b is 800 C, but the actual temperature achieved is only 790 C, the controller 107 may be programmed to send a command to flow valve 110 to reduce flow thus allowing more time for the fluid mixture to travel through the second chamber 104 and to receive more heat from the reacted fluid first chamber 109.

In another example, if the temperature of the outgoing fluid 108 is too high, the controller 107 may send a command to valve 114 or 115 to alter the ratio of fluids to reduce the temperature by for example reducing the ratio of fuel to oxygen. If the temperature of the outgoing fluid 108 is too low, the controller 107 may send a command to increase the ratio of fuel to oxygen, thereby increasing the heat released by reaction and increasing the outgoing fluid temperature. If the desired ratio of fluids as measured at the sensor, exit mixture measuring probe 117, is not attained, the controller could tweak valves 110, 114 or 115 to compensate. The controller 107 may also command the external heater 106 to increase or decrease the heat provided in order to control the process.

It should be noted that several heat and mass transfer changes occur as portions of the fluid move down the second chamber 104 and through the perforations 105. As the fluid mixture flows down the second chamber 104, increasing portions of it are transferred through the pores or perforations 105, and its mass flow rate down the second chamber 104 declines. The lowest mass flow rate would typically be at the far end 104b of the second chamber 104. Lower mass flow rates mean longer residence times. Longer residence times increase the amount of heat being transferred, which helps raise the temperature of the unreacted fluid. After the fully reacted fluid exits the far end 104b of the second chamber 104, it is joined by the fluid that seeped through the walls of the second chamber 104, gradually increasing its mass flow rate, even as it heats up the seeped fluid and causes it to react.

The fluid at the far end 104b of the second chamber 104 is hotter than at the near end 104a and the fluid at 104b is closer to the reaction temperature threshold where the exothermic reaction would occur, and may already be reacting. Once the fluid mixture crosses the critical/threshold temperature, if necessary aided by the external heater 106, additional heat may be released by the reaction itself, that further speeds up the reaction rate of the unreacted fluid.

The space 109, which is the space between the second chamber 104 and the reactor wall 102, typically contains fluid that has already reacted exothermically, and is therefore at a temperature higher than that needed for the reaction to occur. Any small amounts of cooler non-reacted fluid that enter the space 109 via pores 105 will immediately meet a larger mass of hotter, reacted fluid, which will heat up the non-reacted fluid above reaction temperature, causing it to react and release heat, with the reaction accelerating as the fluid gets hotter.

At the same time, the previously reacted fluid is cooling because some of its heat transfers to the cooler fluid. The reaction can be designed such that the heat lost in heat transfer may be recovered or even exceeded by heat gained because of the exothermic reaction. Thus, even though the fluid traveling up the first chamber 109 may be giving up some of its heat, it may be gaining at least as much as it loses, and its average temperature therefore stays constant or even rises. The temperature at 109a at the far end of the first chamber is above the temperature for the fluid to react. The temperature at 109b, at the near end of the first chamber, is also above the temperature for the fluid to react, and the temperature at 109a and 109b may be substantially the same, or, if desired, the temperature at 109b may be greater than at 109a.

By judicious design of the flow path, perforations 105 and temperature controls, as disclosed herein, the actions and reactions in first chamber 109 can be controlled. The fluid at the far end 104b of the reactor 102 has reacted because it exceeded reaction temperature, if necessary, aided by the heater 106; the exothermic reaction further increases its temperature. This hotter reacted fluid rises through the space 109; as it travels up the space 109, it meets more unreacted fluid through the perforations 105, and its mass flow increases. Its temperature stays constant or increases because of the exothermic reactions occurring, depending on for example the concentration of the fluid mix supplied.

The structural and functional configuration of the exothermic reactor disclosed herein is versatile in various aspects. As an example, the length of the reactor 102 and the heat transfer properties of the second chamber 104, the surface area of the heat exchanger and the perforations 105 may also be designed in order to achieve the optimum heating, reaction, peak temperatures, flow regimes and other characteristics to ensure that the reaction is complete, self-sustaining, and that the temperature exiting the reactor is the right temperature for the use of heat produced. Other processes achieve a peak temperature, then dilute the mixture to achieve the desired temperature, and the chambers must be built with expensive materials that can withstand the peak temperature. For this invention, the desired temperature is substantially the peak temperature, therefore less expensive materials may be used.

While the reactor 102 and second chamber 104 are described as cylindrical or tubular, they may also be of any shape that is convenient. While the near end 104a and far end 104b of the reactor 102 and second chamber 104 are described here for convenience in describing the actions taking place, they may be vertical, horizontal, or inverted or even at an angle to the vertical. While they are shown as straight lines, they may also be curved or irregular shaped. Further, it should be understood that the terms "up", "down", "upward", and "downward" are used for convenience in explaining the figures and are not otherwise relevant to the invention.

Figure 2:
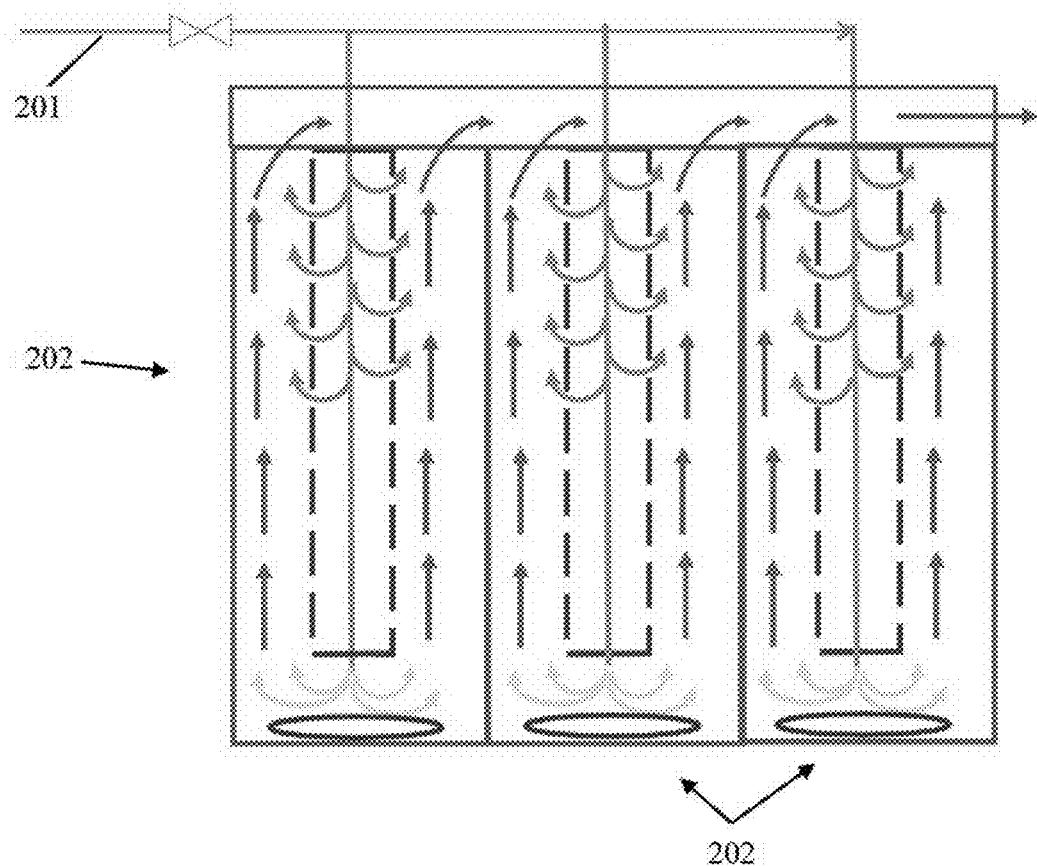
FIG. 2 is a diagram of a plurality of reactors each performing the same function, as needed to achieve the reaction, according to an aspect.

FIG. 2 shows that there may be a plurality of reactors 202 each performing the same function, as needed to achieve the reaction. Multiple reactors 202 may be separated from each other, or adjacent to one another in which configuration they may transfer heat from one reactor to another. Multiple reactors may have systems common to more than one reactor. One advantage of having a plurality of reactors is to increase heat transfer and porosity. The heat transfer wall surface can be doubled by doubling the number of reactors; the numbers of pores can also be similarly doubled.

Figure 3:
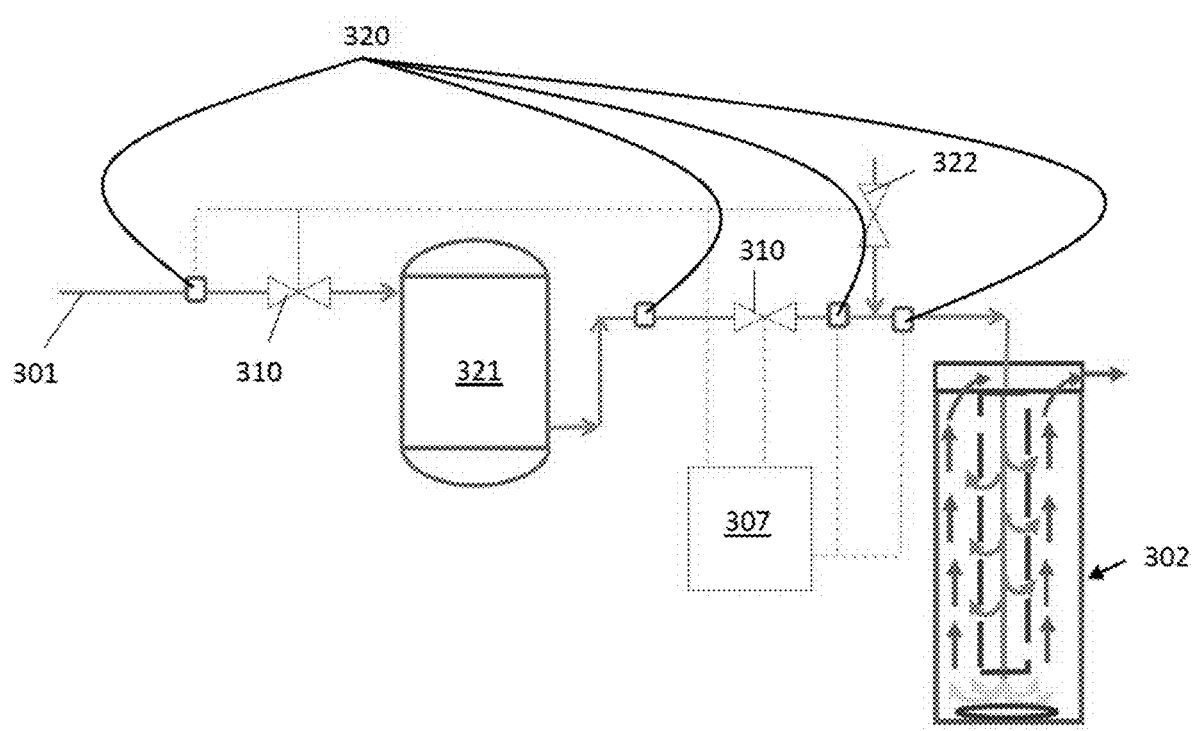
FIG. 3 is a diagram of reactor system for a situation where the proportion of one fluid to the other in the mixture varies with flow, according to an aspect.

FIG. 3 shows a reactor system in a situation where the proportion of one fluid to the other in the mixture varies with flow. While the invention could handle some variation in proportions, it may be easier to reduce the variation in proportion so that the temperature increases during the reaction are easier to control. Incoming means 301 has a mixture of fluids whose ratio to one another varies with time and flow. Sensors 320 may be used to detect the ratio of fluids, and the fluids that are delivered to a vessel 321 through regulating valve 310. The vessel 321 takes mixtures of varying ratios and holds them. If needed, the vessel 321 may have a mixing device, such as a fan or pump or stirrer inside the vessel 321 to mix the incoming fluids.

The vessel 321 may be sized such that fluids entering the vessel 321 have time to mix, thus evening out the variation in ratio of the constituents.

Figure 4:
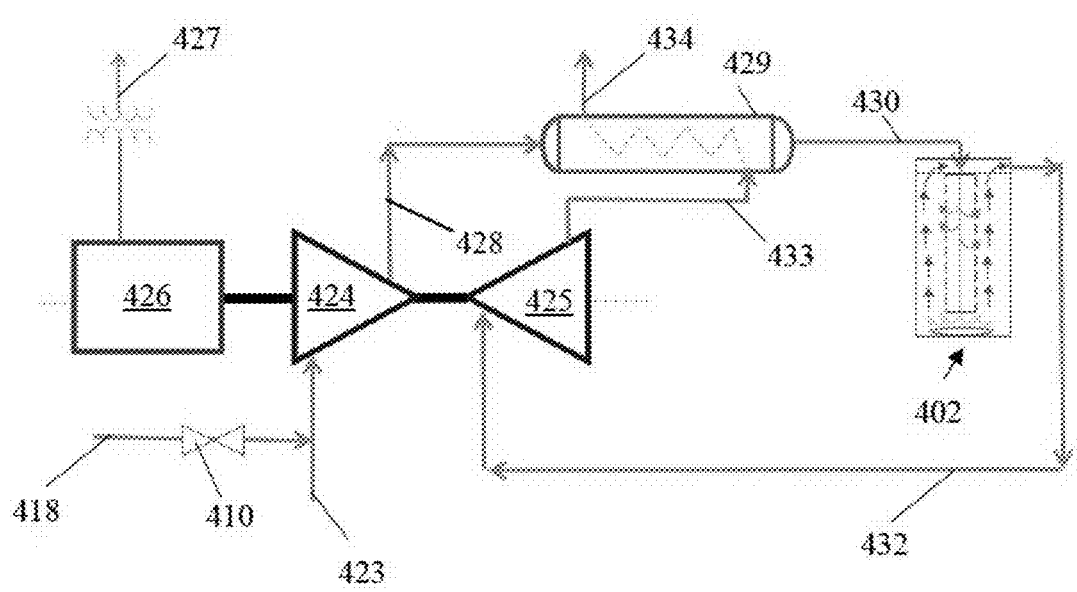
FIG. 4 is a diagram of a reactor system depicting an example application, which utilizes both a compressor and a turbine, according to an aspect.

FIG. 4 shows one possible application for the invention as part of a gas turbine power plant, in which a stream of fuel in air may be compressed to a pressure that is needed for the gas turbine inlet. The mixture is heated and the fuel and oxygen in the air reacted which further raises the temperature of the reacted gas, increasing its energy content. The hot pressurized gas is then used to drive the turbine that drives an electricity generator, converting its stored thermal energy into mechanical energy and then electrical energy. Air may be introduced through means 423, and gaseous fuel may be introduced through means 418 and control valve 410. The fuel/air mixture may be compressed in compressor 424 and delivered by means 428 to a heat exchanger commonly called a recuperator 429, where the mixture may be heated, but not mixed, with hot turbine exhaust gas delivered by means 433. The heated mixture now may be delivered to the porous reactor 402 through means 430, where the fuel may be reacted by the oxygen in the air, and the hot, pressurized gas may be delivered through means 432 to a gas turbine 425. The turbine 425 drives the compressor 424 and an electric generator or other device 426, producing useful power. The gases leaving the turbine 425 travel through means 433 to the heat exchanger 429 before being discharged to the atmosphere through means 434.

Figure 5:
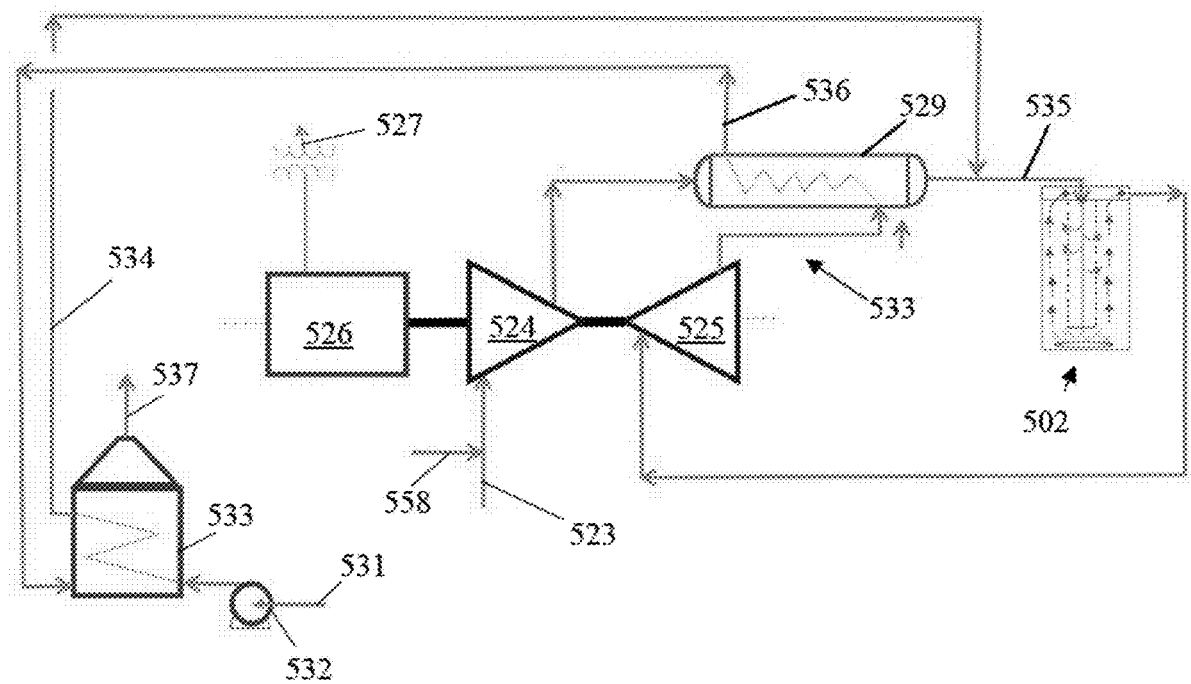
FIG. 5 is a diagram of a reactor system depicting an example application, which utilizes, a compressor, a vaporizer, and a turbine, according to an aspect.

FIG. 5 shows another possible application for the exothermic reactor disclosed herein. A stream of liquid fuel and water 531 enters a pump 532, which delivers the pressurized liquid mixture to an evaporator 533, that evaporates the mixture, sending the vapor through means 534 where it is introduced in to a pressurized and heated air stream similar to the air stream in FIG. 4.

The evaporator may be a commercially available evaporator or boiler in which a stream of pressurized hydrocarbon/water mixture is evaporated. The evaporation pressure should be higher than the pressure at 535, allowing the vapor of hydrocarbon and water to be introduced into 535.

The gas to heat the evaporator 533 may be the effluent gas 536 from the recuperator 529. This gas exits the evaporator 533 into the atmosphere through 537. The system may be initially started in the manner shown in FIG. 4, with fuel gas introduced at 558. Once the system is in operation, the fuel gas introduced at 558 may be reduced, or may be discontinued, and the system can run on the fuel from the vapor in the hydrocarbon/water mix. The remainder of the system functions largely as described in FIG. 4.

Figure 6:
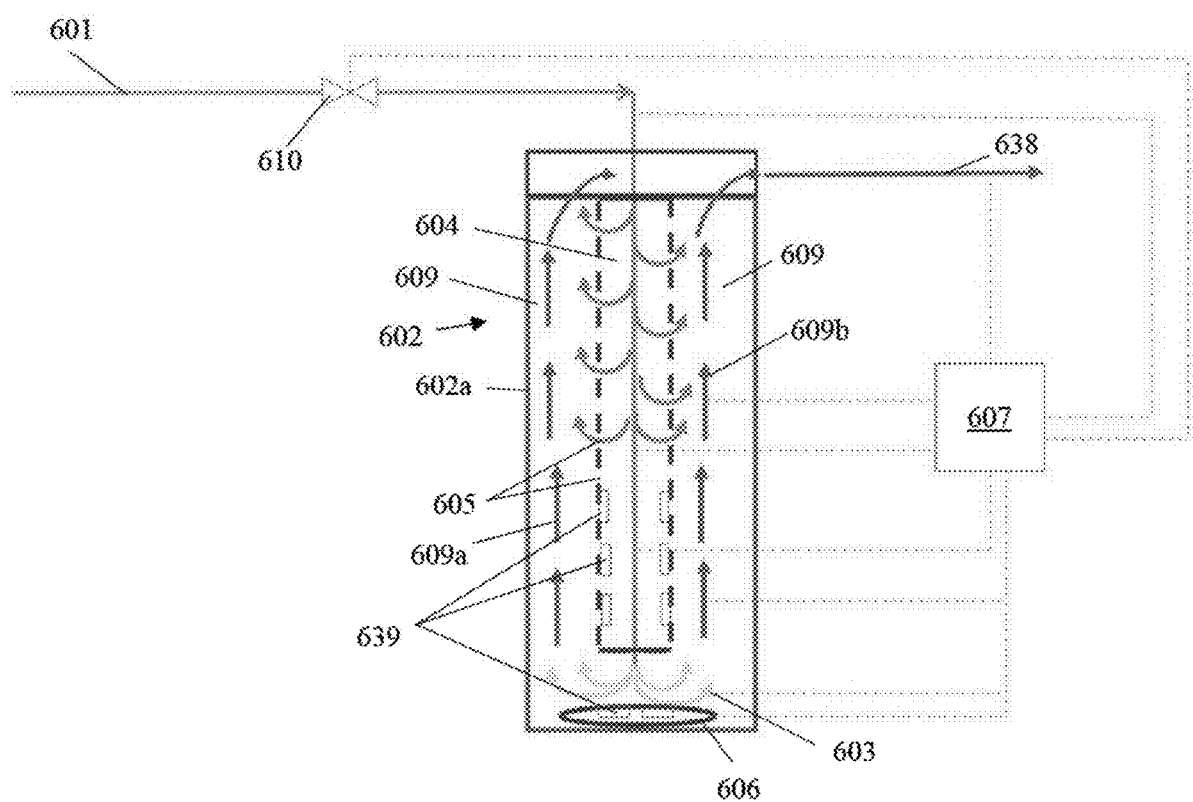
FIG. 6 is a diagram showing the placement of a catalyst to aid the reaction, according to an aspect.

FIG. 6 shows a reactor similar to the reactor in FIG. 1, but also includes the placement of catalyst 639 in the second chamber 604 in the region where the incoming fluids are already hotter. The catalyst is used to lower the temperature at which the fluid mixture reacts. Fluids coming into contact with the catalyst 639 will react, releasing heat and helping nearby fluids to react. It may not be necessary for all the fluid to come in contact with the catalyst 639. As with other means for heating the incoming fluids, the catalyst acts as one of the agents to assist the reaction. Once the adjacent fluid temperature reaches the threshold where it will start to react, its temperature will increase, and trigger reaction from other fluid adjacent to it. The catalyst 639 may be at other locations to those shown, including at the pores 105 in the second chamber 104. The purpose of using catalyst is to initiate the reaction, not to complete it. Catalyst may also be used instead of using heater 606 or elsewhere, including even before the fluid enters the reactor.

The reactor system and method disclosed herein has several benefits. It is compact and efficient compared to other means of reactions, it substantially reduces the size and cost of the apparatus needed to complete the reaction. It allows close control of the temperature of the reactor 602 and exit fluids. If the fluids are gaseous, the energy from the exothermal reaction can be utilized, for example, to power a gas turbine, making steam, or for heating. If the fluids are liquids, the energy could be used for heating purposes. It avoids debris shed by ceramic heat soak media other reactors use. It has lower heat loss than other, bulky systems. By keeping the peak temperature substantially the same as at the maximum temperature needed for the gas turbine, it allows less expensive materials to be used and also avoids forming harmful nitrogen oxides.

Figure 7:
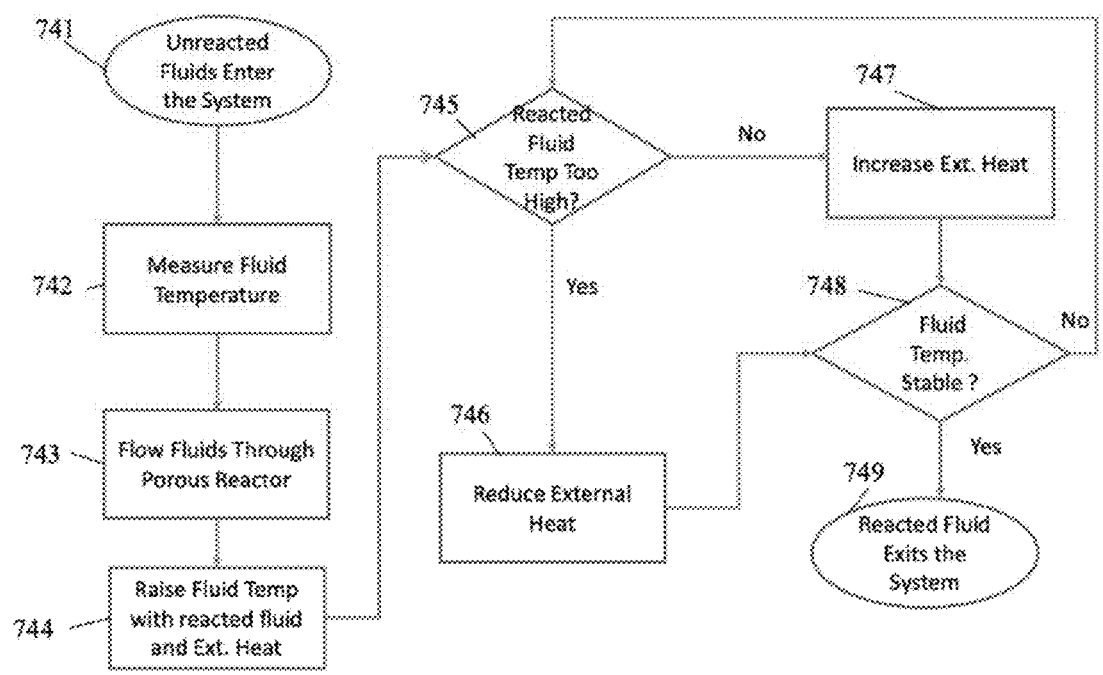
FIG. 7 is a flowchart depicting an exemplary method of using the reactor system, according to an aspect.

FIG. 7 is a flowchart depicting an exemplary method of using the reactor system disclosed herein, according to an aspect. In an example, unreacted fluids enter the system 741 and have their temperature measured 742. Then, the fluids flow through the porous reactor 743, where the fluid temperature may be raised using heat transfer from reacted fluid and also using external heat 744, enhanced by catalyst, if necessary. If the temperature of the reacted fluid is too high 745, the external heat is reduced 746. If the temperature of the reacted fluid is too low, external heat is increased 747. When the temperature is stable, the reacted fluid would then exit the system 749. If the fluid temperature is not stable 748, the reacted fluid temperature 745 would undergo the previous steps until the fluid was stable and allowed to exit the system 749.

In order to further illustrate how reactor system disclosed herein works, an example is provided below of one of the uses to which it may be applied. It is commonly known that methane (CH4) is one of the hardest of common hydrocarbon gases to react. If methane can be reacted, it follows that other hydrocarbons too can be reacted. Methane reacts with oxygen, which may be supplied from air, with the reaction:

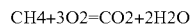
CH4+3O2=CO2+2H2O

The two reactants in the mixture of this example are methane and oxygen. It is well accepted that the auto-ignition, or auto-oxidation, temperature of methane is about 600 C. That means that methane starts to react at 600 C. The rate of reaction is low at the lowest auto-ignition temperatures and increases with temperature. At 600 C the methane starts to react with oxygen and can take up to one second to fully react. At higher temperatures the rate of oxidation increases. At a temperature of 900 C, the oxidation rate is below 1 millisecond.

Figure 8:
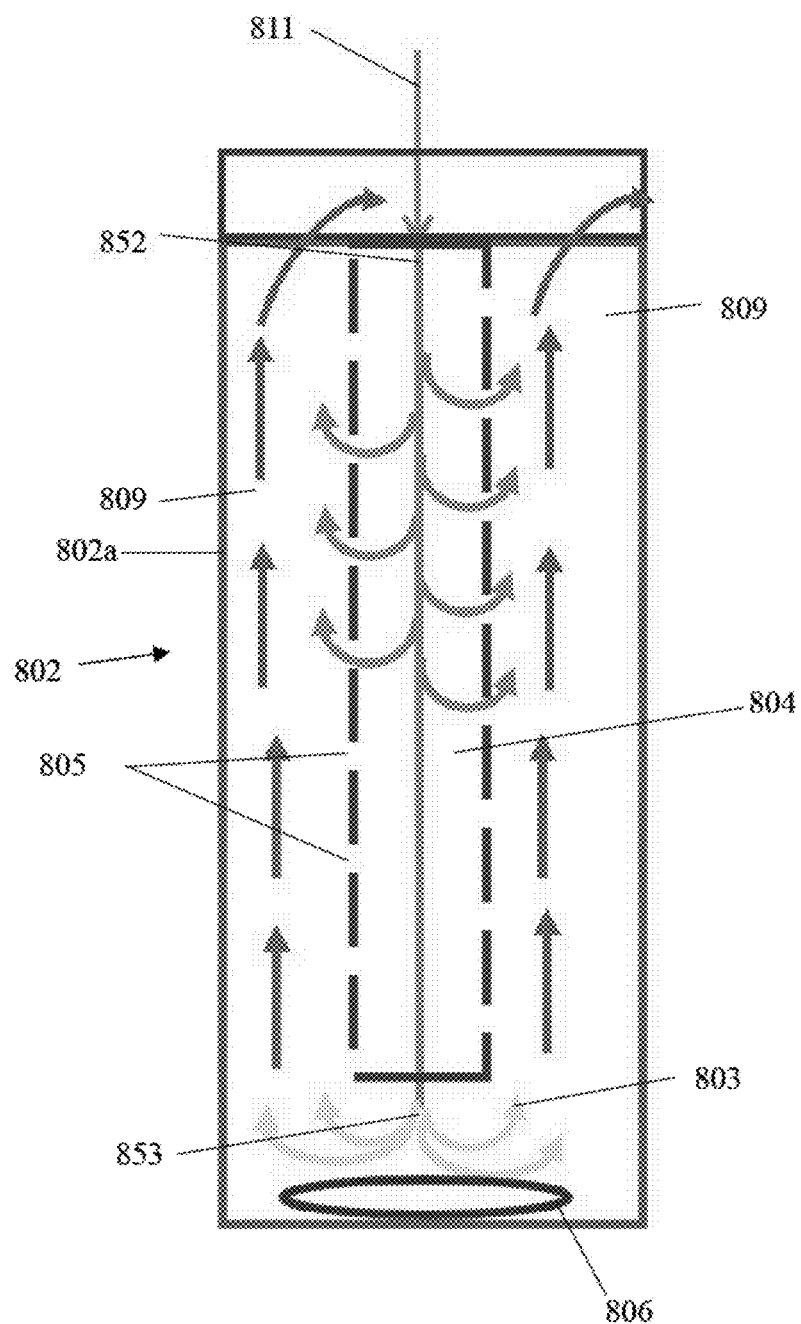
FIG. 8 is a diagram depicting an isolated reactor having a porous heat exchanger.

The methane/air mixture enters the reactor 802 (FIG. 8) and into the second chamber 804 through the inlet 811 at 575 C, below 600 C, which is a little below the auto-ignition or auto-reaction temperature at which methane begins to react. The space 809 surrounding 804 is at 900 C and heat is transferred through the wall of 804 heating up the incoming mixture. As the incoming mixture travels downwards, its flow keeps reducing because portions of the fluid seeps through the pores 805 in the second chamber 804. At 852 the fluid is at auto-ignition temperature of 600 C, and it starting to react, but the reaction rate is very slow.

As the fluid flows further down, it gets hotter from heat transfer and from the heat of its own reaction, and the rate of oxidation increases. By the time the fluid reaches 853 the flow is no more than a quarter of the incoming flow and its reaction rate is much more rapid. It may already be at 900 C, and at that temperature whatever fluid is unoxidized will do so within 1 millisecond. The slow flow rate provides enough time for the reaction to be completed. If it has not reached 900 C by the time it reaches 853, then the external heater 806 will be turned on to raise the temperature to 900 C thereby making sure that all fluid at 803 is fully oxidized. The quantity of the fluid that must be so heated is a small fraction (e.g., no more than 25%) of the total fluid entering at 811; furthermore, the fluid is already hot and close to being fully reacted. Therefore, demand on the energy required from the external heater is low.

The reacted fluid at 803 is at 900 C, and it travels up the first chamber 809. As it does so, it meets small particles of fluid seeping through each of the pores 805. This fluid is already reacting, and when it meets the larger stream of hotter reacted fluid, it rapidly heats up on contact and reacts to completion, releasing the heat of reaction, and thereby maintaining the temperature at 900 C.

Instead of an external heater, it may be possible to use a catalyst that causes the mixture to react at a lower temperature; a catalyst will make the system even simpler. The catalyst will have to assist only a small fraction of the fluid to react, because the heat of reaction will also help. The rate of flow increases as the reacted fluid travels upwards through the space 809, because it collects more and more fluid that reacts as it seeps through the pores. The temperature in 809 is preferably maintained at 900 C. If it tends to increase, the fuel in the mixture is cut back and if it tends to decrease, the fuel in the mixture is increased.

It may be advantageous to set forth definitions of certain words and phrases used in this patent document. The term "couple" and its derivatives refer to any direct or indirect communication between two or more elements, whether or not those elements are in physical contact with one another.

The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items. The terms "up", "down", "upwards", "downwards", "inside", "outside" and similar words are for purposes of distinguishing one zone or area from another or for correlating with the figures, and are not intended to be construed in any other way.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A reactor for a mixture of fluids that can react with each other exothermically, the reactor combining the properties of heat transfer and porosity and comprising:
    a) an inlet with a mixture of unreacted entering fluids that are desired to react with each other, wherein the mixture of unreacted fluids is below a reaction temperature threshold that is necessary for reaction to occur;
    b) a first chamber extending from a far end to a near end of the reactor and forming the hotter side of a heat exchanger, wherein reacted fluids are maintained above the reaction temperature threshold, and wherein the mixture of reacted fluids flows within the first chamber from the far end to the near end, and then out of the reactor;
    c) a second chamber disposed adjacent to the first chamber and also extending from the far end to the near end of the reactor, the second chamber forming the cooler side of the heat exchanger;
    d) wherein, the far ends of the first and second chambers are in communication with one another, thus allowing fluids exiting the far end of the second chamber to flow into the far end of the first chamber;
    e) wherein a wall separates the first chamber from the second chamber that enables heat to be transferred through the wall from the first chamber to the second chamber;
    f) wherein the wall between the chambers has a plurality of pores, such as to allow at least 75% of the mixture of unreacted fluids to enter the second chamber to seep through the pores from the second chamber into the first chamber, such that no more than 5% of the seepage is to occur via any single pore;
    g) wherein the seeped fluids, due to being further heated by the mixture of reacted fluid in the first chamber, react within the first chamber and release exothermic heat of reaction;
    h) wherein the mixture of reacted fluid from the far end of the first chamber travels to the near end of the first chamber while mixing with the fluids seeped via the plurality of pores from the second chamber into the first chamber, heating the seeped fluids and causing them to react.

2. The reactor of claim 1 wherein the first chamber surrounds the second chamber.

3. A reactor for a mixture of fluids that can react with each other exothermically, the reactor combining the properties of heat transfer and porosity and comprising:
    a) an inlet with a mixture of unreacted entering fluids that are desired to react with each other, wherein the mixture of unreacted fluids is below a reaction temperature threshold that is necessary for reaction to occur;
    b) a first chamber wherein reacted fluids are maintained above the reaction temperature threshold;

c) a porous wall disposed between the first chamber and a second chamber allowing portions of fluids coming from the inlet and entering and flowing through the second chamber to seep into the hotter reacted fluids of the first chamber, thereby heating the seeped fluids, causing the seeped fluids to react, the reaction increasing the temperature of the fluids;

d) a heat exchanger formed by the first chamber as the hotter side and the second chamber as the cooler side of the heat exchanger, that transfers heat from the fluid in the first chamber to the fluid in the second chamber, raising the temperature of the fluid in the second chamber to, or close to, the reaction temperature threshold.

4. The reactor of claim 3 wherein the mixture of fluids is formed of two gases.

5. The reactor of claim 3 wherein the mixture of fluids is formed of two liquids.

6. The reactor of claim 3 wherein the mixture of fluids is formed of one gas and one liquid.

7. The reactor of claim 3 wherein the reacted fluids from the reactor are used to power a gas turbine.

8. The reactor of claim 3 wherein surplus heat from the reaction is used to evaporate the mixture to a gaseous form.

9. The reactor of claim 3 wherein catalysts are used to enhance the rate of the reaction.

10. The reactor of claim 3 wherein a heating source is used to start the reaction or to stabilize the reaction or both.

11. The reactor of claim 3 further comprising means to reduce the variations of concentrations of constituents of the fluid mixture that vary with time.

12. The reactor of claim 3 further comprising means to change the concentration of constituents of the fluid mixture.

13. The reactor of claim 3, wherein pores of the porous wall are selectively sized and positioned at optimal locations.

14. A reactor for a mixture of fluids that can react with each other exothermically, the reactor combining the properties of heat transfer and porosity and comprising:

a) a first chamber wherein reacted fluids are maintained above the reaction temperature threshold and wherein the reacted fluids flow in a first direction;

b) a second chamber disposed adjacent to the first chamber, wherein unreacted fluids enter the second chamber at a temperature that is below a reaction temperature threshold that is necessary for reaction of the fluids to occur, the reacted fluids flowing in a second direction, reverse the first direction;

c) a porous wall disposed between the first chamber and a second chamber, allowing portions of the unreacted fluids from the second chamber to seep into the reacted fluids of the first chamber, thereby heating the seeped fluids, causing the seeped fluids to react, the reaction increasing the temperature of the reacted fluid; and d) a heat exchanger formed by the first chamber as the hotter side and the second chamber as the cooler side of the heat exchanger, that transfers heat from the reacted fluid to the unreacted fluids in the second chamber, raising the temperature of the unreacted fluids.

15. The reactor of claim 14 further comprising a heating source adapted to heat up the fluid mixture exiting the second chamber when needed to start the reaction or to stabilize the reaction.

16. The reactor of claim 14 further comprising a control system comprising one or more of a mixture probe, a temperature probe, a fluid valve for each fluid in the mixture of fluids, a flow control valve and a controller that is programmed to receive data from the mixture and temperature probes and based thereon control the fluid and flow control valves to maintain the concentrations of the fluids in the mixture and the temperature of the fluid mixture at optimal levels.

17. The reactor of claim 14 further comprising a mixing chamber that evens out the variation in ratio of constituents of the fluid mixture, before the fluid mixture reaches the second chamber.

18. The reactor of claim 14 wherein the second chamber comprises a catalyst that lowers the reaction temperature threshold of the fluid mixture.

* * * * *